United States Patent
Chun et al.

(10) Patent No.: US 8,837,413 B2
(45) Date of Patent: Sep. 16, 2014

(54) METHOD OF TRANSMITTING/RECEIVING CONTROL INFORMATION OF DATA CHANNEL FOR ENHANCED UPLINK DATA TRANSMISSION

(75) Inventors: Sung Duck Chun, Gyeonggi-do (KR); Young Dae Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 301 days.

(21) Appl. No.: 13/562,206

(22) Filed: Jul. 30, 2012

(65) Prior Publication Data

US 2012/0294261 A1 Nov. 22, 2012

Related U.S. Application Data

(62) Division of application No. 11/718,887, filed as application No. PCT/KR2005/003792 on Nov. 9, 2005, now Pat. No. 8,259,656.

(60) Provisional application No. 60/627,098, filed on Nov. 9, 2004.

(30) Foreign Application Priority Data

Jun. 15, 2005 (KR) ........................ 10-2005-0051299

(51) Int. Cl.
*H04W 4/00* (2009.01)
*H04W 72/04* (2009.01)
*H04W 80/00* (2009.01)
*H04L 29/08* (2006.01)

(52) U.S. Cl.
CPC .......... *H04W 72/0413* (2013.01); *H04W 80/00* (2013.01); *H04L 69/324* (2013.01)
USPC ........................................................ 370/329

(58) Field of Classification Search
CPC ... H04L 69/324; H04L 5/0035; H04L 5/0055; H04L 5/0057; H04L 12/2869; H04L 12/5695; H04L 47/00; H04L 47/70; H04L 47/78; H04L 47/821; H04L 47/827; H04W 72/0413; H04W 80/00; H04W 72/04
USPC ............. 370/203, 216, 230, 230.1, 310, 311, 370/315, 318, 328, 329, 331, 335, 338, 349, 370/394, 395.64, 428, 516
See application file for complete search history.

(56) References Cited

U.S. PATENT DOCUMENTS

| | | | |
|---|---|---|---|
| 5,659,756 | A | 8/1997 | Hefferon et al. |
| 6,198,728 | B1 | 3/2001 | Hulyalkar et al. |

(Continued)

FOREIGN PATENT DOCUMENTS

| | | |
|---|---|---|
| CN | 101069447 | 11/2007 |
| EP | 1361514 | 11/2003 |

(Continued)

OTHER PUBLICATIONS

European Patent Office Application Serial No. 11001423.0, Search Report dated Dec. 2, 2013, 4 pages.

(Continued)

*Primary Examiner* — Jung-Jen Liu
(74) *Attorney, Agent, or Firm* — Lee, Hong, Degerman, Kang & Waimey

(57) ABSTRACT

A method of receiving control information for an uplink in a network includes receiving, by at least one Medium Access Control (MAC) sub-layer in the network, a MAC-e Protocol Data Unit (PDU) from a User Equipment (UE) via an Enhanced Dedicated Channel (E-DCH) which is an uplink transport channel handled by the at least one MAC sub-layer; and acquiring the control information from the received MAC-e PDU, the control information indicating an amount of resources required by the UE. A first format of the MAC-e PDU is received when the control information is included with other information in the MAC-e PDU and a second format of the MAC-e PDU is received when only the control information is included in the MAC-e PDU. The first format of the MAC-e PDU includes a first indicator having a first specific value to indicate that the MAC-e PDU includes the control information.

13 Claims, 3 Drawing Sheets

(56) References Cited

U.S. PATENT DOCUMENTS

| | | |
|---|---|---|
| 6,771,614 B1 | 8/2004 | Jones, IV et al. |
| 2002/0021698 A1* | 2/2002 | Lee et al. ............... 370/394 |
| 2002/0021714 A1 | 2/2002 | Seguin |
| 2002/0080820 A1 | 6/2002 | Hashem et al. |
| 2003/0147371 A1* | 8/2003 | Choi et al. ............. 370/341 |
| 2004/0160919 A1 | 8/2004 | Balachandran et al. |
| 2004/0160959 A1 | 8/2004 | Balachandran et al. |
| 2004/0189522 A1* | 9/2004 | Watanabe et al. ........ 342/387 |
| 2004/0219919 A1 | 11/2004 | Whinnett et al. |
| 2005/0053035 A1* | 3/2005 | Kwak et al. ............. 370/331 |
| 2006/0009232 A1* | 1/2006 | Vakil et al. ............. 455/453 |
| 2006/0023678 A1* | 2/2006 | Twitchell, Jr. .......... 370/338 |
| 2006/0120404 A1* | 6/2006 | Sebire et al. ............ 370/469 |
| 2007/0081513 A1* | 4/2007 | Torsner .................. 370/349 |
| 2008/0037474 A1* | 2/2008 | Niwano .................. 370/335 |
| 2009/0016278 A1* | 1/2009 | Wakabayashi ........... 370/329 |

FOREIGN PATENT DOCUMENTS

| | | |
|---|---|---|
| JP | 2006-027834 | 2/2006 |
| RU | 2187205 | 8/2002 |
| WO | 2004075442 | 9/2004 |
| WO | 2005078967 | 8/2005 |
| WO | 2006027834 | 3/2006 |

OTHER PUBLICATIONS

Krishnan Kumaran et al., "Uplink scheduling in CDMA packet-data systems," 22nd Annual Joint Conference of the IEEE Computer and Communications Societies, Mar. 30, 2003, vol. 1, pp. 292-300.

European Telecommunications Standards Institute (ETSI), "Universal Mobile Telecommunications System (UMTS); FDD Enhanced Uplink; Overall Description; Stage 2 (Release 6)," ETSI TS 125 309, v6.0.0, Sep. 2004.

Samsung, "Uplink signalling for Node B controlled scheduling", 3GPP TSG-RAN WG1 Meeting #38, R1-040854, Aug. 2004.

* cited by examiner

METHOD OF TRANSMITTING/RECEIVING CONTROL INFORMATION OF DATA CHANNEL FOR ENHANCED UPLINK DATA TRANSMISSION

CROSS-REFERENCE TO RELATED APPLICATIONS

This application is a divisional of U.S. patent application Ser. No. 11/718,887 filed on May 22, 2008, now U.S. Pat. No. 8,259,656, which is the National Stage filing under 35 U.S.C. §371 of International Application No. PCT/KR2005/003792, filed on Nov. 9, 2005, which claims the benefit of earlier filing date and right of priority to Korean Application No. 10-2005-0051299, filed on Jun. 15, 2005, and also claims the benefit of U.S. Provisional Application No. 60/627,098, filed on Nov. 9, 2004, the contents of which are all hereby incorporated by reference herein in their entirety.

TECHNICAL FIELD

The present invention relates to a method of transmitting data in a mobile communication system, and more particularly, to a method of transmitting/receiving control information of a data channel for enhanced uplink data transmission. Although the present invention is suitable for a wide scope of applications, it is particularly suitable for transmitting/receiving the control information efficiently.

BACKGROUND ART

FIG. 1 is a block diagram of a network structure of a mobile communication system of UMTS (universal mobile telecommunications system).

Referring to FIG. 1, a UMTS mainly consists of a user equipment (UE), a UMTS terrestrial radio access network (hereinafter abbreviated UTRAN), and a core network (hereinafter abbreviated CN).

The UTRAN consists of at least one radio network subsystem (hereinafter abbreviated RNS). Each RNS consists of one radio network controller (hereinafter abbreviated RNC) and at least one base station (hereinafter named Node B) managed by the RNC. A MAC-e sublayer or similar-entity may be provided according to a controlled transport channel type.

FIG. 2 is a structural diagram of a radio interface protocol between UE and UTRAN (UMTS terrestrial radio access network) based on the 3GPP radio access network standard.

Referring to FIG. 2, a radio interface protocol horizontally consists of a physical layer, a data link layer, and a network layer and vertically consists of a user plane for data information transfer and a control plane for signaling transfer.

Protocol layers in FIG. 2 can be divided into a first layer (L1) a second layer (L2) and a third layer (L3) based on three lower layers of the OSI (open system interconnection) standard model widely known in communication systems.

The physical layer of the first layer provides an information transfer service to higher layers using a physical channel. The physical layer is connected to a medium access control layer above the physical layer via a transport channel. Data are transferred between the medium access control layer and the physical layer via the transport channel. And, data are transferred between different physical layers, i.e., the physical layer of a transmitting side and the other physical layer of a receiving side via the physical channel.

The medium access control (hereinafter abbreviated MAC) layer of the second layer provides a service to a radio link control layer above the MAC layer via a logical channel. And, the MAC layer is divided into various kinds of sublayers including a MAC-d sublayer, a MAC-e sublayer and the like according to a controlled transport channel type.

Structures of DCH (dedicated channel) and E-DCH (enhanced dedicated channel) are explained as follows.

DCH and E-DCH are transport channels dedicated to one user equipment. In particular, E-DCH is used for the user equipment to transfer uplink data to UTRAN and is capable of transferring the uplink data faster than DCH. To transfer data fast, E-DCH employs HARQ (hybrid ARQ), AMC (adaptive modulation and coding), Node B controlled scheduling and the like.

For E-DCH, Node B transfers downlink control information to UE to control E-DCH transfer of the UE. The downlink control information includes response information (ACK/NACK), E-DCH resource allocation information for Node B controlled scheduling and the like. Meanwhile, UE transfers uplink control information to Node B. The uplink control information includes E-DCH resource allocation request information (rate request information) for Node B controlled scheduling, UE buffer status information, UE power status information and the like.

MAC-d flow is defined between MAC-d and MAC-e for E-DCH. A dedicated logical channel is mapped to MAC-d flow, MAC-d flow is mapped to the transport channel E-DCH, and the transport channel E-DCH is mapped to a physical channel E-DPDCH (enhanced dedicated physical data channel) again.

The MAC-d sublayer is in charge of managing DCH (dedicated channel) dedicated to a specific UE. And, MAC-e/MAC-es sublayer is in charge of a transport channel E-DCH (enhanced dedicated channel) used in transferring fast uplink data.

A transmitting side MAC-d sublayer configures MAC-d PDU (protocol data units) from MAC-d SDU (service data units) delivered from a higher layer, such as the RLC layer. A receiving side sublayer plays a role in restoring MAC-d SDU from the MAC-d PDU received from a lower layer to deliver to a higher layer. In doing so, the MAC-d sublayer mutually exchanges the MAC-e sublayer with the MAC-d PDU or a physical layer with MAC-d PDU over DCH. The receiving side MAC-d sublayer restores MAC-d SDU for delivery to a higher layer using a MAC-d header included in the MAC-d PDU.

A transmitting side MAC-e/MAC-es sublayer configures MAC-e PDU from MAC-d PDU delivered from a higher layer, such as a MAC-d sublayer. A receiving side MAC-e sublayer plays a role in restoring MAC-es PDU from the MAC-e PDU received from a lower layer, such as a physical layer. A receiving side MAC-es sublayer plays a role in restoring MAC-d PDU from MAC-es PDU for delivery to the MAC-d sublayer. In doing so, the MAC-e sublayer exchanges the physical layer with MAC-e PDU via E-DCH.

FIG. 3 is a diagram of a protocol for E-DCH.

Referring to FIG. 3, a MAC-e sublayer supporting E-DCH exists below each MAC-d sublayer of UTRAN and UE. The MAC-e sublayer of the UTRAN is located at Node B and the MAC-e sublayer exists in each UE.

Meanwhile, a MAC-d sublayer of the UTRAN is located at SRNC in charge of managing the corresponding UE. And, the MAC-d sublayer exists in each UE.

Control information transmission over E-DCH is explained as follows.

In E-DCH, a scheduler exists in the Node B. The scheduler plays a role in allocating optimal radio resources to UEs located within one cell to raise transmission efficiency of data arriving at the Node B from the entire UEs within each cell in the uplink direction, respectively. Specifically, in one cell, a UE in good radio channel status can transmit more data by receiving more radio resource allocation, whereas another UE in poor radio channel status is prevented from transmitting interference signals over an uplink radio channel by receiving less radio resource allocation. Hence, a quantity of uplink data transmissions in the entire cell can be optimized in the above-explained manner.

Yet, the scheduler considers other factors as well as the radio channel status of the UE in allocating radio resources to the UE. The scheduler needs control information from UEs. For example, the control information includes a power that can be used for EDCH by the UE, a quantity of data the UE attempts to transmit, and the like. In other words, although the UE is in excellent radio channel status, if there is no spare power the UE can use for the E-DCH or if there is no data the UE will transmit in uplink direction, it is not allowed to allocate the radio resources to the UE. Hence, the scheduler just allocates the radio resources to the UE having the spare power for the E-DCH and the data to transmit in uplink, thereby raising efficiency in using the radio resources within one cell.

So, the UE has to send control information to the scheduler at the Node B in various ways. For instance, the scheduler at the Node B can order the corresponding UE to report if the data to be transmitted in uplink exceeds a predetermined value or the Node B can order the UE to send the control information to the Node B itself periodically.

The UE, to which the radio resource was allocated, configures MAC-e PDU within the allocated radio resource and then transmits the MAC-e PDU to the Node B over E-DCH.

Namely, the UE having the data to be transmitted sends the control information to the Node B to notify that there is the data to be transmitted by the UE itself. The scheduler of the Node then sends the information indicating the allocation of radio resource to the UE based on the control information having sent from the UE. In this case, the information indicating the allocation of radio resource means a maximum power for uplink transmission from the UE, a ratio to a reference channel, etc. The UE configures MAC-e PDU within the allowed range based on the information indicating the allocation of the radio resource and then transmits the configured MAC-e PDU.

In brief, in the E-DCH, incase of having data to be transmitted, the UE informs the Node B that there is the data to be transmitted. Once the radio resource is allocated to the UE from the Node B, the corresponding UE transmits real user data in a direction of the Node B.

In this case, a size of the radio resource is named a radio resource allocation quantity, which means a maximum value of power allowed to the UE to use and the like in case that the UE transmits the data in uplink. IF there is no radio resource allocation quantity and if there exists the data to be sent in uplink, the UE sends radio resource allocation request information to the Node B. Once receiving a radio resource allocation message from the Node B, the UE transmits the data in uplink using the power within a radio resource allocation quantity range indicated by the message.

If there is the radio resource allocated to the UE, i.e., if the radio resource allocation quantity is not zero (there is data to be transmitted in uplink), the corresponding UE immediately transmits the data in the uplink.

As mentioned in the foregoing description, in order for the UE to transmit the user data in uplink, it is important for the UE to transmit the appropriate radio resource allocation request information to the Node B at the proper time to have a suitable radio resource allocation quantity set by the Node B. The appropriate radio resource allocation quantity is important, which is because the allowable radio resource in the mobile communication system is limited.

However, the above-explained related art method has the following problem.

For instance, assuming that the power usable for uplink transmission of the UE is 10 dBm, if the quantity of the radio resource allocated to the UE is 20 dBm, this means a waste of the radio resource. If the power acceptable by the cell is 20 dBm, another UE loses its chance to transmit data in uplink.

Hence, the demand for a method of allocating a radio resource most efficiently within a radius of one Node B rises.

DISCLOSURE OF INVENTION

Accordingly, the present invention is directed to a method of transmitting/receiving control information of a data channel for enhanced uplink data transmission that substantially obviates one or more problems due to limitations and disadvantages of the related art.

An object of the present invention is to provide a method of transmitting/receiving control information of a data channel for enhanced uplink data transmission, by which efficient radio resource allocation is enabled.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting control information of a data channel for enhanced uplink data transmission, in which the control information is transmitted from a mobile terminal, according to the present invention includes the step of transmitting the control information using MAC PDU (protocol data unit) including the control information.

Preferably, the control information transmitting step includes the steps of including the control information in the MAC PDU and transmitting the MAC PDU over a first physical channel.

Preferably, the method further includes the step of transmitting information about whether the control information is included in the MAC PDU only.

Preferably, the method further includes the step of if a plurality of control informations are included in the MAC PDU, including a first indicator identifying a plurality of the control informations in the MAC PDU.

Preferably, the MAC PDU includes the control information only. The MAC PDU includes the control information and user data together. And, the data channel for the enhanced uplink data transmission includes an E-DCH (enhanced dedicated channel).

More preferably, the first physical channel includes an E-DPDCH (enhanced dedicated physical data channel.

Preferably, in the step of transmitting the information about whether the control information is included in the MAC PDU only, the information about whether the control information is included in the MAC PDU only is transmitted over a second physical channel.

More preferably, in the step of transmitting the information about whether the control information is included in the MAC PDU only, the information about whether the control information is included in the MAC PDU only is included in the MAC PDU.

More preferably, in the step of transmitting the information about whether the control information is included in the MAC PDU only, the information about whether the control information is included in the MAC PDU only is included in a header of the MAC PDU.

More preferably, the method further includes the step of including a second indicator identifying a recipient receiving a plurality of the control informations in the MAC PDU.

In another aspect of the present invention, a method of receiving control information of a data channel for enhanced uplink data transmission, in which the control information is received by a base station, includes the step of receiving the control information using MAC PDU (protocol data unit) including the control information.

Preferably, the control information receiving step includes the steps of receiving a data block over a first physical channel and delivering the data block to a MAC layer to enable the MAC layer to acquire the control information.

Preferably, the method further includes the step of receiving information about whether the control information is included in the MAC PDU only.

Preferably, the method further includes the step of if a plurality of control informations are included in the MAC PDU, receiving a first indicator identifying a plurality of the control informations included in the MAC PDU.

Preferably, the MAC PDU includes the control information only. The MAC PDU includes the control information and user data together. And, the data channel for the enhanced uplink data transmission includes an E-DCH (enhanced dedicated channel).

More preferably, the first physical channel includes an E-DPDCH (enhanced dedicated physical data channel.

More preferably, in the step of receiving the information about whether the control information is included in the MAC PDU only, the information about whether the control information is included in the MAC PDU only is received over a second physical channel.

More preferably, in the step of receiving the information about whether the control information is included in the MAC PDU only, the MAC PDU including the information about whether the control information is included in the MAC PDU only is received.

More preferably, in the step of receiving the information about whether the control information is included in the MAC PDU only, a header of the MAC PDU including the information about whether the control information is included in the MAC PDU only is received.

In another aspect of the present invention, a method of transmitting control information of a data channel for enhanced uplink data transmission, in which the control information is transmitted from a mobile terminal, includes the step of deciding whether the control information transmitted by the mobile terminal is transmitted according to a channel.

Preferably, the method further includes the step of transmitting the control information according to a result of the deciding step.

Preferably, the control information is radio resource allocation request information.

More preferably, the radio resource allocation request information is information about a buffer status of the mobile terminal.

More preferably, the information about the buffer status is information relating to an absolute quantity of data stored in a buffer of the mobile terminal.

More preferably, the information about the buffer status is information about a variance of data stored in a buffer of the mobile terminal.

It is to be understood that both the foregoing general description and the following detailed description of the present invention are exemplary and explanatory and are intended to provide further explanation of the invention as claimed.

BEST MODE FOR CARRYING OUT THE INVENTION

Figure 1:
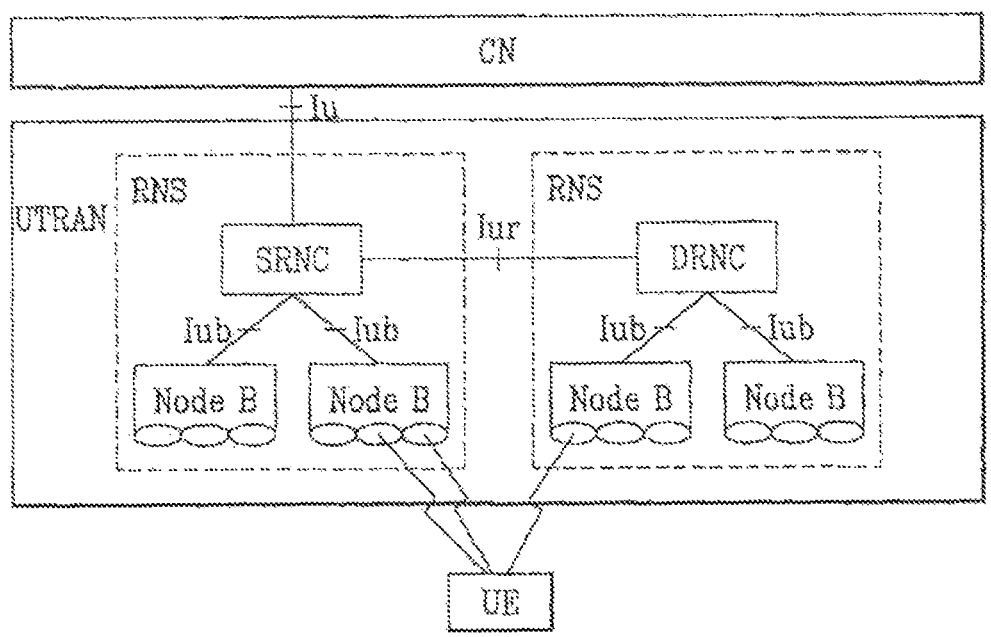
FIG. 1 is a block diagram of a network structure of a mobile communication system of UMTS (universal mobile telecommunications system)
Figure 2:
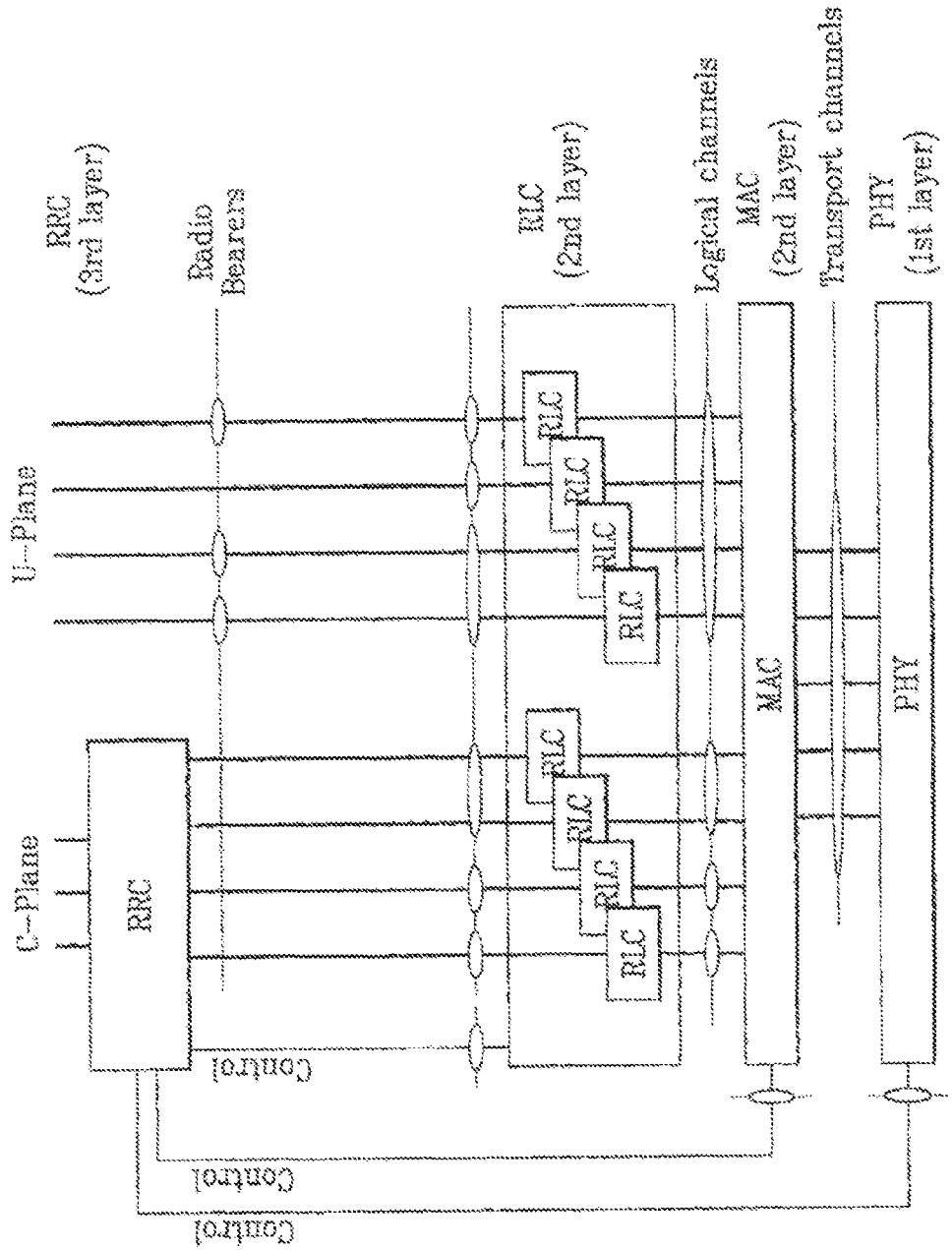
FIG. 2 is a structural diagram of a radio interface protocol between UE and OMAN (UMTS terrestrial radio access network) based on the 3GPP radio access network standard.
Figure 3:
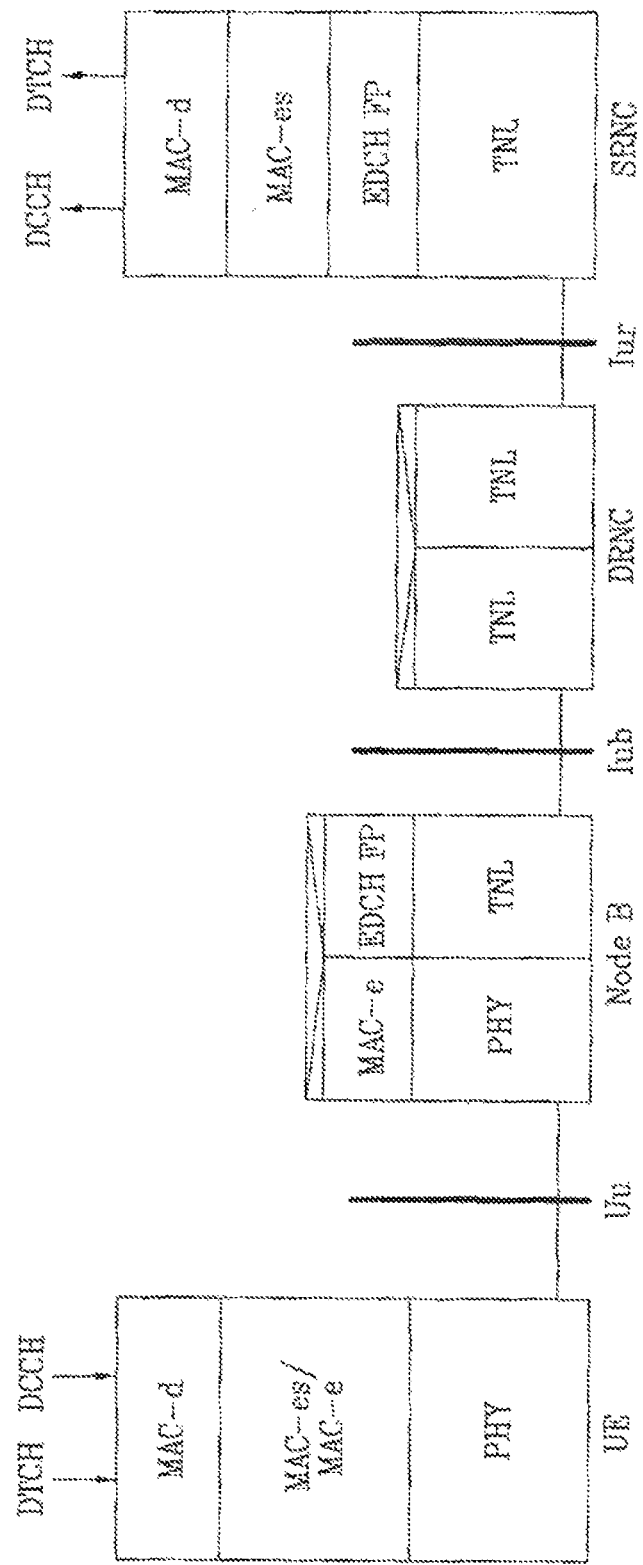
FIG. 3 is a diagram of a protocol for E-DCH.

Reference will now be made in detail to the preferred embodiments of the present invention, examples of which are illustrated in the accompanying drawings. Wherever possible, the same reference numbers will be used throughout the drawings to refer to the same or like parts.

First of all, the present invention proposes a method of sending radio resource allocation request information to a Node 13 from a UE. For this, the present invention proposes to use MAC PDU (protocol data unit) as the radio resource allocation request information transmitted from the UE. In particular, the present invention proposes to use not a signal transfer over such a physical channel as E-DPCCH (enhanced dedicated physical control channel) but a signal transfer of MAC Layer that is a higher Layer of the physical Layer for the radio resource allocation request information transmitted from the UE to the Node B. Namely, the radio resource allocation request information is sent using E-DPDCH (enhanced dedicated physical data channel) over which real user data is delivered.

So, a transmitting side includes control information such as the radio resource allocation request information in MAC PDU and then delivers it to a physical layer of a lower layer. The physical layer transmits it over E-DPDCH. Meanwhile, a physical layer of a receiving side receives data block via E-DPDCH and then delivers it to a MAC layer of a higher layer. The MAC layer then decodes the received MAC PDU to extract the control information.

The control information corresponds to the information for controlling E-DCH such as the radio resource allocation request information, information of physical layer data transfer status, high-quality base station information and the like.

The present invention proposes to transmit various kinds of information such as data transfer status of physical layer, information of highest quality Node B and the like via the MAC layer as well as to deliver the radio resource allocation request information via the MAC layer.

Namely, the present invention proposes to use one lower channel as a path for delivering both of the control information of the higher layer and the user data of the higher Layer.

The present invention proposes various types of MAC PDU used in transmitting the control information. For transmitting the control information, the present invention proposes two types of the MAC PDU, specifically MAC PDU including the control information only (Stand alone PDU) and MAC PDU including both the control information and the user data (Piggybacked PDU). The MAC PDU including only the control information includes no user data but rather only the control information, such as the radio resource allocation request information the transmitting side attempts to transmit. Specifically, in order to receive a service of an appropriate quality, the UE sends the control information to the Node B if necessary. When sending the control information to the Node B, the UE preferably selects a usable MAC PDU type to use according to its situation. The usable MAC PDU types can be classified into the MAC PDU including the control information only and the MAC PDU including both of the control information and the user data.

When using the MAC PDU including the control information only, there are various gains. In most cases, a quantity of the control information is much smaller than of the user data. However, in the radio channel, the larger a size of the data block to be transmitted, the probability of losing the data in a radio interface increases. In other words, the smaller the data block size, the higher the probability of transmission success in the radio interface. The control information transmitted from the UE is essential for the UE to receive the service of the appropriate quality. Hence, the control information should be delivered to the Node B stably as fast as possible. Since the size of the MAC PDU including only the control information is small, the corresponding MAC PDU can be stably delivered to the Node B. Hence, the MAC PDU used in one preferred embodiment of the present invention includes only the control information.

Alternatively, the MAC PDU used in one preferred embodiment of the present invention may include both of the control information and the user data. For example, assuming that the radio resource allocation quantity usable by the UE is greater than 0, if the UE transits the MAC PDU including only the control information, radio resources are wasted. For example, assuming that quantity of the radio resource allocated to the UE is 10 dBm, if power of 1 dBm is consumed in transmitting the MAC PDU including only the control information, the UE wastes 9 dBm of its resource allocation. If the 9 dBm of radio resource allocated to UE is not used in transmitting user data, radio resources that could have enhanced the quality of the radio service provided to the user are wasted. To prevent the unnecessary waste of the radio resources, the MAC PDU can be set to include both the control information and the user data, which is advantageous in raising efficiency of radio resource usage.

In the above-explained process according to one preferred embodiment of the present invention, it is able to use a physical layer in informing a receiving side that the control information is included in the MAC PDU only when the UE transmits the MAC PDU including the control information only.

Specifically, when transmitting the MAC PDU including only the control information, the UE transmits the MAC PDU to the receiving side over the E-DPDCH and sends the information indicating that the control information is included in the MAC-PDU to the transmitting side via E-DPCCH. The transmitting side uses the control information to decode the E-DPDCH. The transmitting side can be informed that only control information is included in various ways. For example, a specific bit of the E-DPCCH may be used or a specific pattern can be inserted in the E-DPCCH. The specific pattern uses the E-TFCI (enhanced transport format combination indicator) of the E-DPCCH, for example. The E-TFCI plays a role in indicating a size of MAC PDU that is being delivered over the E-DPDCH. A specific value of the E-TFCI can indicate that the MAC PDU includes only the control information. Hence, when transmitting the MAC PDU including only the control information, the transmitting side can set the specific value of the E-TFCI using the E-DPCCH. If a specific portion of the E-DPCCH, such as the E-TFCI, indicates the specific value, the receiving side can operate on the assumption that the data delivered via the E-DPDCH includes only the control information.

According to another embodiment of the present invention, to indicate that control information is included in MAC PDU, a first bit of all MAC PDU is usable for indicating whether the control information is included. No limitation is put on a location of the bit. Yet, it is possible for the first bit to indicate whether the control information is included. For instance, if a first bit of MAC PDU is set, it means that control information exists in the MAC PDU. If a first bit of MAC PDU is not set, it means that control information does not exist in the MAC PDU. In this case, a transmitting side can set a first bit of MAC-e PDU in transmitting MAC PDU if control information is included in the MAC PDU. And, it is possible for a receiving side to decide that the control information does not exist in the MAC PDU if the first bit of the received MAC PDU is not set.

According to another embodiment of the present invention, it is able to indicate an existence or non-existence of control information using a specific portion of a header of MAC PDU. There is no limitation put or a type of the specific portion of the header. In the present embodiment, a DDI field is used for example. A field called DDT (data description indicator) exists in a header of MAC PDU. This plays a role in indicating that data blocks included in the MAC PDU correspond to data of which logical channel and a role in indicating how large a size of the each of the blocks is. In the present embodiment, if the DDI designates a specific value, it means that control information exists in the MAC PDU. Hence, if the control information exists in the MAC PDU, a transmitting side preferably includes the DDI set to the specific value in the header part of the MAC PDU.

According to one preferred embodiment of the present invention, it is more preferable that each control information configures one block if there are various kinds of control information in MAC PDU. As mentioned in the foregoing description, it is common that there are various kinds of control information a transmitting side transmits to a receiving side. And, a device facilitating new control information to be included in MAC PDU is frequently needed. Hence, it is preferable that control information included in MAC PDU is configured with extendability. Hence, according to a preferred embodiment of the present invention, control informations configure a control information block. For example, one control information block is allowed to include control informations about power only. In this case, it is preferable that one control information block includes an indicator indicating what kind of control information it is. In the above-explained example, the indicator indicating the control information about power is included in the control information block. If such a control information block is used, a transmitting side includes control information blocks corresponding to an amount the transmitting side needs to transmit in MAC PDU. A receiving side is then able to handle each of the control information blocks in the received MAC PDU. Yet, a length of each information included in the control information block is variable or fixed. Hence, in case of a specific control information block, if the length of the information of the control information block is variable, it is preferable that length information is included right behind the indicator indicating the type of the control information.

Yet, in the above process, there can exist at least one or more receiving sides. For instance, in case of uplink, a receiving side includes Node B and RNC. Hence, either the Node B or the RNC may need the control information. Hence, according to one embodiment of the present invention, it is proposed that an indicator indicating a recipient of the control information is included in the control information block. Namely, if the indicator indicates that the recipient of the control information is the RNC, the Node B immediately delivers the received control information to the RNC. This is performed using recipient information included in the control information. The recipient information is very useful. If the Node B is an old model while the RNC is a new model, i.e., if the Node B is capable of recognizing a previous limited quantity of control information types only, the Node B can deliver the control information to the RNC using the recipient information of the control information without being updated despite being incapable of recognizing the control information.

There is UE buffer status information within a message a UE sends to Node B. The buffer status information can be used for the Node B to set a radio resource allocation quantity suitable for the UE. For instance, assuming that UE has to transmit 1,000-bit data and needs 10 dBm power required for transmitting the data for 10 ms, if Node B sets a radio resource allocation quantity allocated to the UE to 20 dBm, it is a serious waste of radio resource. Hence, UE preferably informs Node B of an accurate data volume to transmit.

For this, according to one embodiment of the present invention, a method that UE informs Node B of its buffer status information. In particular, the WE preferably uses two kinds of mechanisms. One is an absolute buffer status report and the other is a relative buffer status report.

In the absolute buffer status report, the UE reports a volume of data accumulated in its buffer to the Node B as it is. Namely, in case of having 100 kbytes data, the WE reports the 100 kbytes data to the Node B in direct. In doing so, limitation may be put on the expression of the buffer information sent to the Node B from the UE. Namely, the UE may be set to use 5-bits only in expressing its buffer for example. In such a case, the volume of data the UE can represent is not consecutive but can be reported by a predetermined unit only. For instance, if a unit of data volume the UE informs the Node B of is 10 kbytes, the UE informs the Node B of its buffer status by 10 kbyte unit under the circumstances. Despite the above-explained mechanism, the UE reports its data volume represented intact to the Node B under the mechanism.

The relative buffer status report is focused on reporting a status variation of buffer. For instance, the relative buffer status report is a method of informing Node B of a variance of UE's buffer between a current time point and a latest time point of sending buffer information from UE. For example, assuming that a UE's buffer quantity at the time point of sending buffer information to Node B lately is 50 kbytes and if a current UE's buffer quantity is 55 kbytes, a relative buffer status report message informs the Node B of a difference, 5 kbytes, between 55 kbytes and 50 kbytes only.

Compared to the absolute buffer status report, the relative buffer status report is advantageous in that the number of information, i.e., number of bits, required for delivering the same quantity of information is small. Assuming that the information substantially necessary for a user is user data, all control information between UE and Node B is not substantially necessary for the user. Hence, a smaller quantity of the control information is preferred. In this aspect, the relative buffer status report is more advantageous than the absolute buffer status report in the cost required for representing the same control information.

Yet, the relative buffer status report brings about a problem in case that a message right before the report or a previous message is lost or damaged. For instance, it is assumed that a UE initially has 50 kbyte data. And, it is also assumed that two relative buffer status report have been forwarded, and each relative buffer status report includes 10 kbyte information. Namely, the UE has 70 kbyte data at a time point of sending a second relative buffer status report. If a receiving side loses a first relative buffer status report message, the receiving side will incorrectly decide that the UE has 60 kbyte data after having receiving the second relative buffer status report.

To correct this incorrect decision, the present invention proposes to mix the absolute and relative buffer status reports to use. It is apparent to those skilled in the art that there are various methods for using the absolute and relative buffer status reports simultaneously. For instance, if the absolute buffer status report is periodically transmitted or if the absolute buffer status report is transmitted each time a prescribed reference is met, it is able to prevent a problem that a Node B may incorrectly estimate a buffer quantity of UE. For another instance, a UE can send an absolute buffer status report if a physical layer reports a failure of transmission of prescribed MAC PDU, if a transmission of a predetermined number of MAC PDUs is performed, or each time a central base station (serving cell) is changed.

There is no limitation put on the method of transmitting the relative buffer status information from the UE. And, the relative buffer status report car be transmitted in various ways.

First of all, a UE carried out a relative buffer status report each predetermined time. Namely, by making the relative buffer status report regularly, the UE can inform the Node B of the accurate status of the UE.

Secondly, a UE can send a relative buffer status report each time a predetermined reference is met. Namely, for instance, each time a predetermined quantity of data, e.g., new 10 kbyte data arrives at a UE's buffer, the UE informs a Node B of such a fact.

In the above-explained process, the buffer information sent by the UE can be set by taking a total of all channels assigned to the UE as a reference or can be per logical channel assigned to the UE.

In case of using such a service as a voice service, if a UE informs a Node B of a buffer status, if a radio resource allocation quantity suitable for the buffer status is set, and if the UE transmits voice data later, an unnecessarily long delay is brought about to degrade a quality sensed by a user. In this case, it is preferable that specific channels are set so that data can be immediately transmitted as soon as arrives. In case of the voice service, for example, if the voice service data arrives at a buffer, the UE preferably transmits the arriving data in up link via a physical layer. Namely, the UTRAN can set a specific logical channel so that the UE can transmit data at any time.

Over the channel via which the UE can transmit data at any time, the method of transmitting the radio resource allocation request information, and more particularly, the UE's buffer information to the Node B from the UE has a problem. After the UE has transmitted the information, at the time point that the transmitted information arrives at the Node B, the user's voice information data corresponding to the control information has already arrived at Node B or is being transmitted from the UE. Or, the Node B has allocated the radio resource to the UE according to the information transferred from the RNC before receiving the buffer status information from the UE.

Hence, for the channel set to enable the UE to make a transmission at any time, it is unnecessary for the UE to send the control information such as buffer information.

Hence, according to one preferred embodiment of the present invention, it is proposed that the UE does not transmit the control information such as the buffer information of channel over the channel set to enable the UE to make a transmission at any time. Over other channels, it is proposed that the UTRAN sends the control information such as buffer information to the system according to a setup. In the channel set to enable the UE to make a transmission at any time, there are a voice service, a service such as streaming, an SRB (signaling ratio bearer) such as an RRC message in charge of signaling of an upper end of UE, etc. These services can be called guaranteed bit rate services, respectively. The channel set as GBR from the system, and more particularly, the channel set to enable uplink transmission at any time can make the uplink transmission at any time within a range of the quantity allocated from the system.

Accordingly. The present invention provides the following effects or advantages.

First of all, the present invention proposes the method of allocating radio resources in the mobile communication system, thereby enabling efficient and optimal data transmission.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The present invention is suitable for a wide scope of applications, it is particularly suitable for transmitting/receiving the control information efficiently.

The invention claimed is:

1. A method of receiving control information for an uplink in a network, the method comprising:
receiving, by at least one Medium Access Control (MAC) sub-layer in the network, a MAC-e Protocol Data Unit (PDU) from a User Equipment (UE) via an Enhanced Dedicated Channel (E-DCH) which is an uplink transport channel handled by the at least one MAC sub-layer; and
acquiring the control information from the received MAC-e PDU, the control information indicating an amount of resources required by the UE,
wherein:
a first format of the MAC-e PDU is received when the control information is included with other information in the MAC-e PDU and a second format of the MAC-e PDU is received when only the control information is included in the MAC-e PDU;
the first format of the MAC-e PDU includes a first indicator having a first specific value to indicate that the MAC-e PDU includes the control information; and
a second indicator, which is received via an Enhanced Dedicated Physical Channel (E-DPCCH), has a second specific value to indicate that the second format of the MAC-e PDU includes only the control information.

2. The method of claim 1, further comprising allocating the resources to the UE using the control information.

3. The method of claim 1, wherein the control information comprises scheduling information used by the network.

4. The method of claim 1, wherein the control information comprises buffer status information of the UE.

5. The method of claim 1, wherein the control information comprises transmission power information of the UE.

6. The method of claim 1, wherein the second indicator comprises an Enhanced-Transport Format Combination Indicator (E-TFCI).

7. The method of claim 1, wherein the first indicator comprises a Data Description Indicator (DDI).

8. The method of claim 1, wherein the other information included with the control information in the MAC-e PDU comprises user data.

9. The method of claim 1, wherein the first format of the MAC-e PDU is a piggybacked MAC-e PDU.

10. The method of claim 1, wherein the second format of the MAC-e PDU is a stand alone MAC-e PDU.

11. The method of claim 1, wherein the at least one MAC sub-layer comprises a MAC-e sub-layer and a MAC-es sub-layer.

12. The method of claim 11, wherein the MAC-es sub-layer sits on top of the MAC-e sub-layer.

13. The method of claim 11, wherein the MAC-e sub-layer is located in a base station and the MAC-es sub-layer is located in a serving radio network controller (SRNC).

* * * * *